(12) United States Patent
Baker et al.

(10) Patent No.: US 6,718,385 B1
(45) Date of Patent: Apr. 6, 2004

(54) SYSTEM FOR CONTROLLING MOVEMENT OF INFORMATION USING AN INFORMATION DIODE BETWEEN A SOURCE NETWORK AND A DESTINATION NETWORK

(75) Inventors: Lara H. Baker, Los Alamos, NM (US); David J. Bailey, Albuquerque, NM (US)

(73) Assignee: Galaxy Computer Services, Inc., Santa Fe, NM (US)

( * ) Notice: Subject to any disclaimer, the term of this patent is extended or adjusted under 35 U.S.C. 154(b) by 0 days.

(21) Appl. No.: 09/574,366

(22) Filed: May 19, 2000

(51) Int. Cl.[7] .............................................. G06F 15/173
(52) U.S. Cl. ....................................... 709/225; 709/250
(58) Field of Search ........................... 370/392; 709/245, 709/225, 223, 228, 249, 250; 713/2, 162, 201

(56) References Cited

U.S. PATENT DOCUMENTS

| | | | | |
|---|---|---|---|---|
| 5,311,593 A | * | 5/1994 | Carmi | 713/162 |
| 5,550,984 A | * | 8/1996 | Gelb | 709/245 |
| 5,623,601 A | | 4/1997 | Vu | |
| 5,692,124 A | * | 11/1997 | Holden et al. | 713/201 |
| 5,826,014 A | | 10/1998 | Coley et al. | |
| 5,864,683 A | | 1/1999 | Boebert et al. | |
| 5,913,024 A | | 6/1999 | Green et al. | |
| 5,974,547 A | * | 10/1999 | Klimenko | 713/2 |
| 6,128,298 A | * | 10/2000 | Wootton et al. | 370/392 |

FOREIGN PATENT DOCUMENTS

| | | |
|---|---|---|
| WO | WO 95/33239 | 12/1995 |
| WO | WO 96/30840 | 10/1996 |
| WO | WO 99/26121 | 5/1999 |

OTHER PUBLICATIONS

Dave Bailey, Using Layering to Improve System Security, Oct. 1995, pp. 1–9, Galaxy Computer Services, Inc., Santa Fe, NM 87501.

Dave Bailey and Lara Baker, Analysis of Low to High Data Flow, May 1996, pp. 1–17, Galaxy Computer Services, Inc., Santa Fe, NM 87501.

Dave Bailey and Lara Baker, Old Paradigms Revisited: Applying the Reference Monitor, Mar. 1997, pp. 1–7, Galaxy Computer Services, Inc., Santa Fe, NM 87501.

Galaxy Computer Services, Inc., Secure Diode Security Features User's Guide, Dec. 29, 1997, pp. 1–7, Galaxy Computer Services, Inc., Santa Fe, NM 87501.

Galaxy Computer Services, Inc., Secure Diode Security Strategy, Feb. 5, 1998, pp. 1–8, Galaxy Computer Services, Inc., Santa Fe, NM 87501.

Galaxy Computer Services, Inc., Secure Diode Trusted Facility Manual, Feb. 5, 1998, pp. 1–9, Galaxy Computer Services, Inc., Santa Fe, NM 87501.

Galaxy Computer Services, Inc., Information Diode Price List, Sep. 1998, cover page and pp. 1–3, Galaxy Computer Services, Inc., Santa Fe, NM 87501.

(List continued on next page.)

Primary Examiner—Zarni Maung
(74) Attorney, Agent, or Firm—Luedeka, Neely & Graham, P.C.

(57) ABSTRACT

A system that allows movement of information from a source network to a destination network, but prohibits movement of information from the destination network to the source network. A low-side network interface receives a request, and a low-side processor analyzes the request to determine whether it is allowable. A high-side processor denies all request and data from the destination network. In this manner, the high-side processor allows no information to flow from the destination network to the source network.

27 Claims, 10 Drawing Sheets

OTHER PUBLICATIONS

Galaxy Computer Services, Inc., Final ASDN Secure Diode Project, Maintenance Concept, Apr. 12, 1999, cover page/table of contents and pp. 1–8, A–1 thru E–2, Galaxy Computer Services, Inc., Santa Fe, NM 87501.

Galaxy Computer Services, Inc., Final ADSN Secure Diode Project, Bench Stock, Apr. 12, 1999, cover page/table of contents and pp. 1–7, A–1 thru E–10, Galaxy Computer Services, Inc., Santa Fe, NM 87501.

Secure Diode, Technical Manual, May 25, 1999.

Galaxy Computer Services, Inc., Information Diode, Executive Summary, (no date), cover page and pp. 1–2, Galaxy Computer Services, Inc., Santa Fe, NM 87501.

* cited by examiner

SYSTEM FOR CONTROLLING MOVEMENT OF INFORMATION USING AN INFORMATION DIODE BETWEEN A SOURCE NETWORK AND A DESTINATION NETWORK

TECHNICAL FIELD

The present invention is generally directed to maintaining security in a computer network. More particularly, the invention is directed to a system that allows flow of information in one direction only: from a source network to a destination network, such as from a low-security network to a high-security network.

BACKGROUND OF THE INVENTION

Computers are often used to store sensitive information. Such information may include government-classified information and business-sensitive proprietary information. For example, government agencies construct and maintain networks of computers for storing and analyzing vast amounts of secret and top-secret classified data. Those government agencies attempt to maintain the security of their computer networks by electronically isolating those high-security networks from the rest of the world. The goal is to prevent both accidental and clandestine transfer of classified information from the high-security network to a non-secure or low-security network.

There are situations in which it is desirable for a computer connected to a high-security network to be able to access information that resides on a low-security network. For the computer on the high-security network to have such access to low-security information, the high-security network must be electronically connected to the low-security network. However, whenever a connection exists between a high-security network and a low-security network, a threat of the accidental or clandestine transfer of classified information to the low-security network also exists.

Therefore, there is a need for a system that connects a high-security network to a low-security network, that allows transfer of low-security information from the low-security network to the high-security network, and that prohibits transfer of high-security information from the high-security network to the low-security network

SUMMARY OF THE INVENTION

The foregoing and other needs are met by a system for controlling movement of information between a source network and a destination network, where the information includes source network information on the source network and destination network information on the destination network. The system includes a low-side network interface for receiving from the source network a low-side request relating to the information. The system also includes a low-side processor for analyzing the low-side request to determine whether the low-side request is allowable. If the low-side request is a request to write source network information to the destination network, the low-side processor generates an acknowledgment in response, so that the requested information transfer may proceed. However, if the low-side request is a request to read destination network information from the destination network, the low-side processor denies the low-side request.

If the low-side request is a request to write source network information to the destination network, the low-side network interface receives the acknowledgement from the low-side processor, sends the acknowledgement to the source network, receives source network information from the source network in response to the acknowledgement, and sends the source network information to a low-side intermediate network interface.

The low-side intermediate network interface sends the source network information across an intermediate network to a high-side intermediate network interface. The high-side intermediate network interface receives the source network information, and sends the source network information to a high-side network interface. The high-side network interface receives the source network information, and sends the source network information to the destination network.

The system also includes high-side processor that denies all information packets from the destination network received by the high-side network interface. In this manner, the high-side processor allows no information to flow from the destination network to the source network.

Thus, the invention provides a two-layered system that denies all requests to write or read destination network information, while allowing requests to write source network information. In this way, the invention prohibits the flow of destination network information from the destination network to the source network, while allowing source network information to flow to the destination network.

In another aspect, the invention provides a method for controlling movement of information between a source network and a destination network, where source network information resides on the source network and destination network information resides on the destination network. The method includes the steps of: (a) moving the source network information from the source network to a low-side processing system using a first information transfer protocol that precludes movement of destination network information from the low-side processing system to the source network; (b) moving the source network information from the low-side processing system to a high-side processing system across an intermediate network using a network transfer protocol that precludes movement of destination network information from the high-side processing system to the low-side processing system; and (c) moving the source network information from the high-side processing system to the destination network using a second information transfer protocol that precludes movement of destination network information from the destination network to the high-side processing system.

BRIEF DESCRIPTION OF THE DRAWINGS

Further advantages of the invention will become apparent by reference to the detailed description of preferred embodiments when considered in conjunction with the drawings, which are not to scale, wherein like reference characters designate like or similar elements throughout the several drawings as follows.

DETAILED DESCRIPTION OF THE PREFERRED EMBODIMENT

Figure 1:
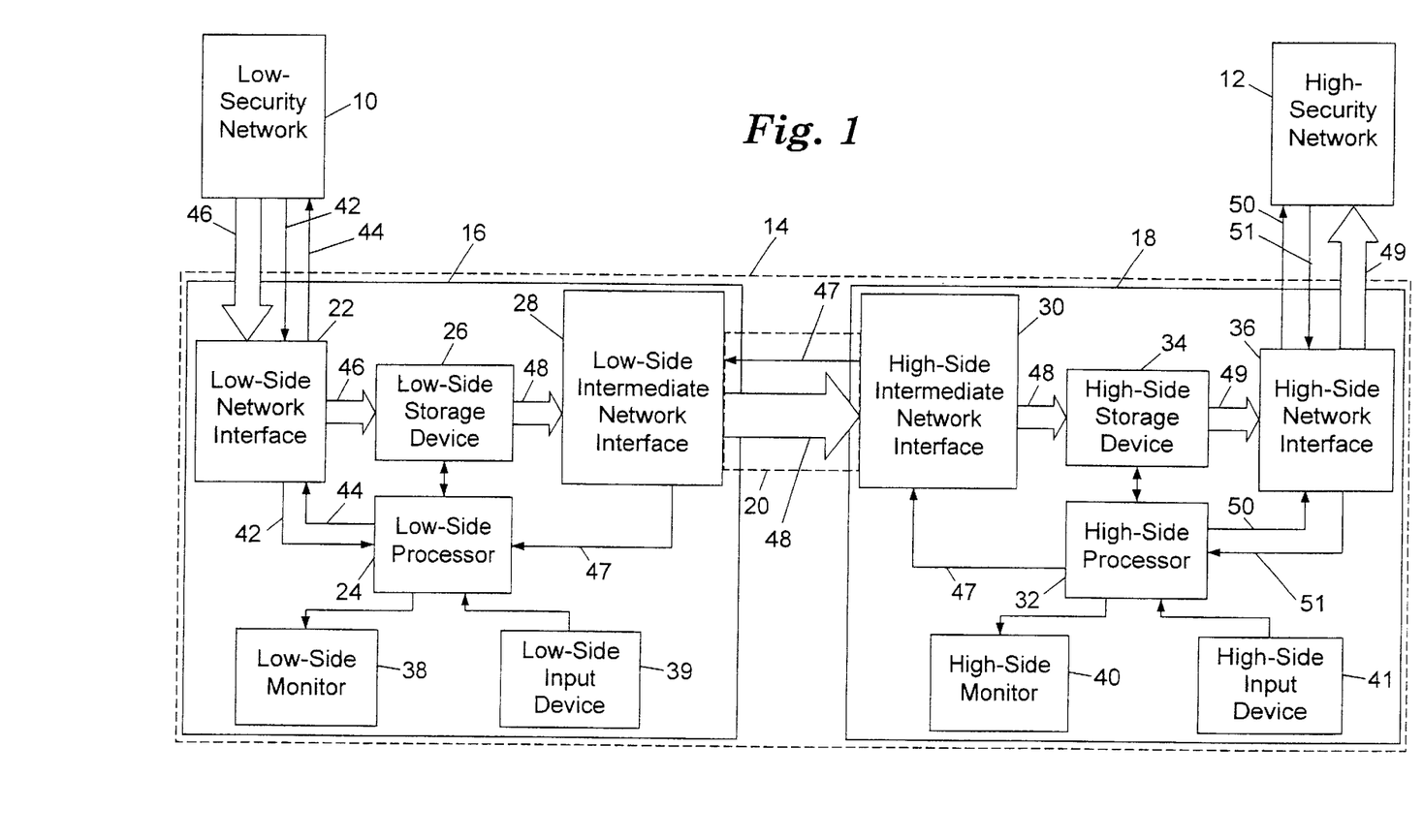
FIG. 1 is a functional block diagram of an information diode according to a preferred embodiment of the invention.

Shown in FIG. 1 is the preferred embodiment of a system for controlling movement of information between a source network 10, such as a low-security network, and a destination network 12, such as a high-security network. The system of FIG. 1 is referred to herein as an information diode 14, because it allows movement of information in only one direction: from the source network 10 to the destination network 12.

In the embodiment of the invention described herein, the source network 10 is a low-security network 10, such as the Internet, and the destination network 12 is a high-security network 12, such as military or government computer network on which resides classified information. However, it will be appreciated that the information diode 14 is not limited to use between high and low-security networks. It may be used between any two networks to limit the flow of information to one direction only.

The information diode 14 consists of two nearly-identical information processing systems: a low-side processing system 16 and a high-side processing system 18. Preferably, the two systems 16 and 18 are implemented as two personal computers having identical hardware, as described in more detail below. The two systems 16 and 18 communicate with each other over an intermediate network 20.

The low-side processing system 16 includes a low-side network interface 22, such as an Ethernet adapter, that connects the low-side processing system 16 to the low-security network 10. The low-side processing system 16 further includes a low-side processor 24, such as an Intel Pentium III or equivalent device, for controlling the movement of source network information, also referred to herein as low-security information, from the low-security network 10 into the low-side processing system 16. The low-side system 16 has a low-side information storage device 26 in which the low-security information is temporarily stored during the transfer process. In the preferred embodiment, the storage device 26 is a SCSI hard drive having at least one gigabyte of storage capacity. The low-side system 16 further includes a low-side intermediate network interface 28, such as an Ethernet adapter, for communicating with the intermediate network 20.

The hardware components of the high-side processing system 18 are preferably identical to the hardware components of the low-side processing system 16. The high-side system 18 includes a high-side intermediate network interface 30, a high-side processor 32, a high-side information storage device 34, and a high-side network interface 36. The high-side intermediate network interface 30 is connected to and communicates with the intermediate network 20. The high-side processor 32 controls the movement of the low-security information from the low-side system 16 and into the high-side system 18. The high-side information storage device 34 temporarily stores the low-security information during the transfer to the high-security network 12. The high-side network interface 36 is connected to and communicates with the high-security network 12.

In the preferred embodiment of the invention, the intermediate network 20 is an Ethernet cable which is no more than a few feet long. Thus, the low-side and high-side processing systems 16 and 18 are preferably located side-by-side in the same room or stacked in a single equipment rack. Since the security offered by the information diode 14 is at least in part dependant on the physical security of the two processing systems 16 and 18 and the intermediate network 20, this preferred close-proximity arrangement provides the highest level of security. However, it should be appreciated that the information diode 14 will function as described herein if the systems 16 and 18 are distant from each other.

As shown in FIG. 1, the low-side and the high-side systems 16 and 18 also preferably include low-side and high-side display monitors 38 and 40, and low-side and high-side input devices 39 and 41, such as keyboards. An operator uses the monitors 38 and 40 and input devices 39 and 41 while operating and maintaining the information diode 14.

Preferably, the low-side and high-side processors 24 and 32 run a UNIX-like software operating system, such as Red Hat Linux. The Linux operating system is preferred because its source code may be easily modified to remove components that are not necessary to accomplish the one-way data transfer process. To limit functionality, the commercial "off-the-shelf" version of the Linux operating system is modified in at least four ways: (1) modifications to the Linux kernel- itself, (2) designation of specific firewall rules, (3) setting file permissions to "immutable", and (4) extraction of extraneous programs, data, and configuration files. Each of these modifications are described in more detail below.

The modifications to the Linux kernel consist of removing components that provide unneeded functionality. For example, IP forwarding, an operating system feature that would make the information diode 14 vulnerable to a "pass-through" of data without security checks, is removed from the kernel.

The firewall rules used in the Linux operating system of the preferred embodiment cause the Linux kernel to reject all information packets except for a very limited set that are needed for functionality of the information diode 14. This limitation precludes the information diode 14 being vulnerable to broad classes of attacks. For example, many attacks target the Transmission Control Protocol (TCP), itself. However, under the firewall rules used in the preferred embodiment of the invention, the information diode 14 does not use TCP packets, but instead uses User Datagram Protocol (UDP) packets. Thus, the firewall rules implemented by the invention reject all TCP attacks before those attacks can affect the information diode 14.

Setting file attributes under the Linux operating system to "immutable" further restricts the functionality of the information diode 14. Under the Linux operating system, a file that is designated "immutable" cannot be changed—under any conditions—until the "immutable" designation is removed. In the modified version of Linux running on the information diode 14 does not include the software needed to remove the "immutable" designation. All operating system files stored in the information diode 14, are set to "immutable" when the operating system software is initially loaded, and are never changed. Thus, except for data files in an index directory (described in more detail hereinafter), all files stored in the information diode 14 are designated "immutable". Therefore, no software or configuration file on the information diode 14 is modifiable while the information diode 14 is operational.

In the modified version of the Linux operating system running on the information diode 14, all programs, data, and configuration files that are not needed for the information diode 14 to function as described herein have been removed. For example, the off-the-shelf version of Linux includes several computer programming languages (such as C++, AWK, F77, and LISP) and the libraries to support these languages. Since none of these files are needed to support the operation of the information diode 14, they have been removed.

In the preferred embodiment, the low-security information is transferred from the low-security network 10 to the low-side system 16 and from the high-side system 18 to the high-security network 12 using two modified versions of a network communication protocol known as Trivial File Transfer Protocol (TFTP). The standard version of TFTP is described by Karen R. Sollins in "RFC 1350: The TFTP Protocol (Revision 2)", MIT, July 1992, the contents of which are incorporated herein by reference. The modified version of TFTP running on the low-side system 16 is referred to herein as a first modified TFTP, and the modified version of TFTP running on the high-side system 18 is referred to herein as a second modified TFTP.

Preferably, the first and second modified TFTP's operate in conjunction with the standard Transmission Control Protocol/Internet Protocol (TCP/IP) for communicating over a global communication network, such as the Internet.

The standard TFTP transfers information using five types of information packets. These five include: (1) a read request (RRQ) packet, (2) a write request (WRQ) packet, (3) a data packet, (4) an acknowledgment (ACK) packet, and (5) an error packet. All of the packets begin with an operation code that identifies the type of packet.

Under the first modified TFTP running on the low-side processor 24, the processor 24 will accept a WRQ or a data packet from the low-security network 10. However, unlike the standard version of TFTP, the processor 24 operating under the first modified TFTP will always deny a WRQ from the high-side system 18, and will always deny a RRQ from the low-security network 10.

Under the second modified TFTP running on the high-side processor 32, the processor 32 will send a WRQ to the high-security network 12. However, unlike the standard version of TFTP, the processor 32 operating under the second modified TFTP will always deny any type of TFTP packet from the high-security network 12 or from the low-side system 16.

In one embodiment of the invention, the low-side processor 24 denies a WRQ from the high-side system 18 by sending an error packet to the high-side system 18 in response to the WRQ. This error packet is referred to herein as a low-side denial since it operates to deny a request to write destination network information to the low-side system 16. The low-side denial effectively prohibits the establishment of a file transfer from the high-side system 18 to the low-side system 16. Similarly, the low-side processor 24 denies a RRQ from the low-security network 10 by sending a low-side denial to the low-security network 10 in response to the RRQ. This prohibits the establishment of a file transfer from the low-side system 16 to the low-security network 10.

In the preferred embodiment, the low-side processor 24 effectively denies a WRQ or a data packet from the high-side system 18, or a RRQ from the low-security network 10 by making no acknowledgement of the attempted communication. Since the device making the unallowable requests gets no reply whatsoever, this method of request denial is referred to herein as a "black hole". With the black hole embodiment, the requesting device is burdened by having no indication whether the request was sent to the correct address or whether the request was ever received by the target device. Thus, the black hole embodiment prohibits all communication between the requesting and target devices when the request comes from an unauthorized source.

According to one embodiment of the invention, the high-side processor 32 denies a WRQ or a data packet from the high-security network 12 by sending an error packet referred to herein as a high-side denial to the high-security network 12. The high-side denial sent to the security network 12 prohibits the establishment of a file transfer from the high-security network 12 to the high-side system 18. Also, the high-side processor 32 denies a RRQ or a WRQ from the low-side system 16 by sending a high-side denial to the low-side system 16 in response to the RRQ. The high-side denial sent to the low-side system 16 prohibits the establishment of a file transfer from the high-side system 18 to the low-side system 16.

Preferably, the high-side processor 32 effectively denies a WRQ or a data packet from the high-security network 12, or any request packet from the low-side system 16, according to the black hole method, as discussed above.

By using two processing systems 16 and 18 operating under different TFTP protocols, the information diode 14 offers a redundant, two-layered protection system. As discussed above, the low-side system 16 operates to deny all requests from the low-security network. However, although highly unlikely, if a request from the low-security network 10 manages to pass through the low-side system 16, or is in some way generated on the low-side system 16, the high-side system 18 will deny it so that it may not pass to the high-security network 12. Thus, there are two layers of protection through which a request from the low-security network 10 must pass to reach the high-security network 12. Similarly, the high-side system 18 operates to deny all WRQ or data packets from the high-security network 12. Again, although highly unlikely, if a WRQ or data packet from the high-security network 12 manages to pass through the high-side system 18, or is in some way generated on the high-side system 18, the low-side system 16 will deny it so that it may not pass to the low-security network 10. Thus, there are two layers of protection through which a WRQ or data packet from the high-security network 12 must pass to reach the low-security network 10.

The advantages offered by the two-layered design of the information diode 14 will be further appreciated by considering a few examples. First, with reference to FIGS. 1 and 2A–C, consider a situation in which a request is made from the low-security network 10 to write a data file from a source device on the low-security network 10 to a target device on the high-security network 12. The source device on the low-security network 10 generates a TFTP WRQ packet, hereinafter referred to as a low-side WRQ 42 (step 100 in FIG. 2A). The low-side WRQ 42 contains a source transfer identifier (TID) which identifies the source device on the low-security network 10 as the source of the request. The low-side WRQ 42 is transferred to the low-side processor 24 via the low-side network interface 22 (step 102).

Upon receipt of the low-side WRQ 42, the processor 24 determines from which TCP/IP communication port the WRQ 42 was received. If the WRQ 42 comes from any TCP/IP port other than that corresponding to the low-security network 10, the WRQ 42 will be denied. This counteracts "spoofing", which is an attempt to deceive the target device by setting the TID of a request packet to indicate a false source of the request. Although the "spoofed" TID may falsely indicate that the source of a request is a device on the low-security network 10, the processor 24 determines the true source of the request according to the TCP/IP port from which it came.

Figure 2A:
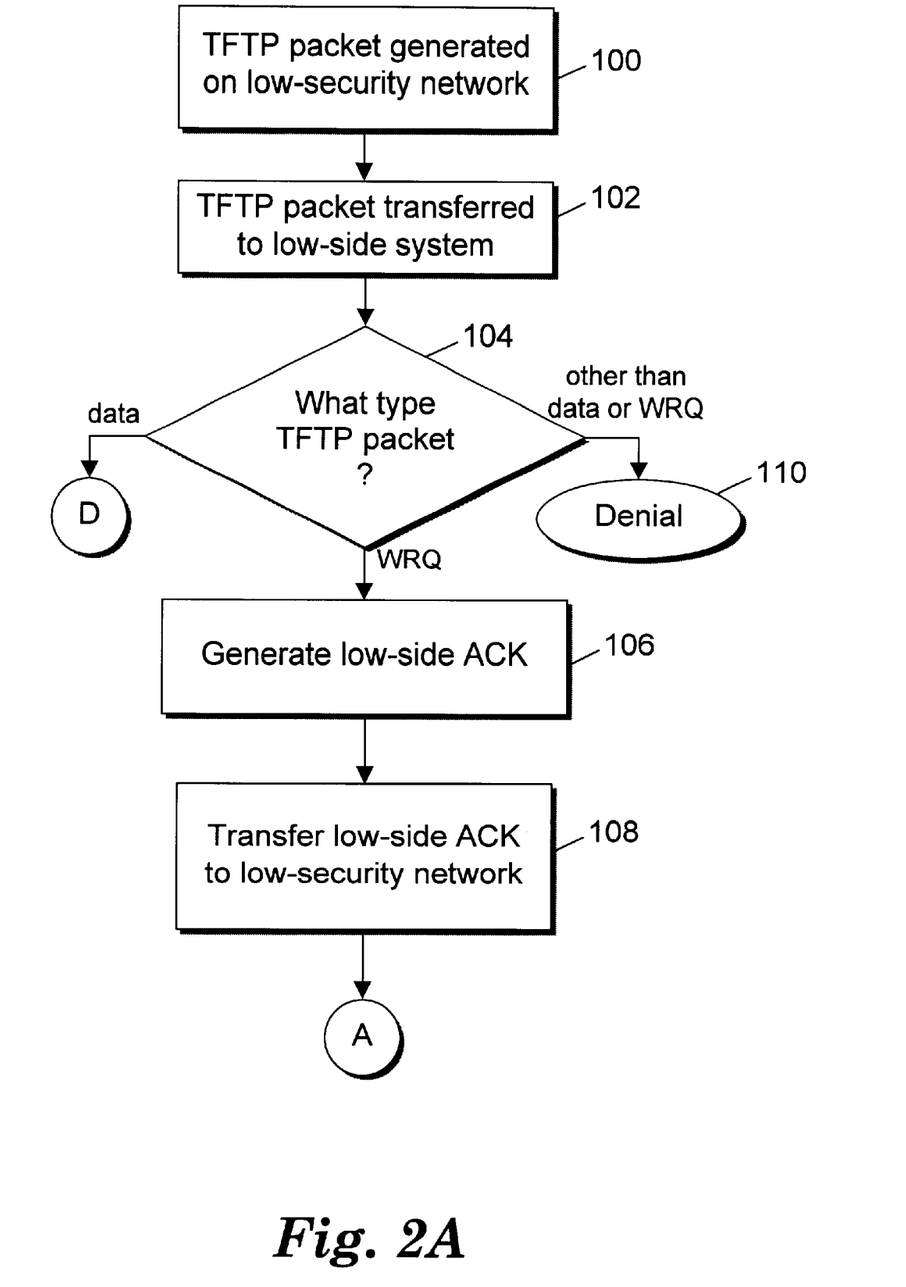
FIGS. 2A, 2B, and 2C are functional flow diagrams depicting operation of the information diode according to a preferred embodiment of the invention.

The low-side processor 24 also checks the operation code of the WRQ 42 to determine what type of TFTP packet has been received (step 104). In this situation, since the WRQ 42 is a write request (indicated by operation code of 2) received from the TCP/IP communication port corresponding to the low-security network 10, and since a WRQ from the low-security network 10 is allowable under the first modified TFTP, the low-side processor 24 acknowledges the WRQ 42 with a low-side acknowledgement packet (ACK) 44 (step 106). The low-side network interface 22 communicates the low-side ACK 44 to the source device on the low-side network 10 (step 108). Preferably, if the TFTP packet is anything other than a WRQ or a data packet from the low-security network 10, the low-side system 16 denies the request (step 110). In the preferred embodiment, the denial is accomplished by making no response whatsoever, thereby presenting a black hole to the packet.

The source device on the low-side network 10 receives the low-side ACK 44 (step 120 in FIG. 2B), and in response sends the data file to the low-side system 16. According to the TFTP protocol, this transfer is preferably done in sequential 512-byte blocks of data. Thus, in response to the low-side ACK 44, the source device on the low-security network 10 sends the first block of data in the requested data file to the low-side system 16 (step 122). The low-side system 16 responds to a successful transfer of the first data block by sending a low-side ACK 44 to the source device on the low-security network 10 (step 124). Upon receipt of the low-side ACK 44 from the low-side system 16, the source device sends the next block of data in the requested file (step 122). This process continues in lock-step fashion until the last data block in the data file has been transferred to the low-side system 16 (step 126). The data blocks of low-security information are transferred into the low-side system 16 by way of the low-side network interface 22. The flow of the low-security information from the data file to the low-side system 16 is represented in FIG. 1 by the arrows 46.

Figure 2B:
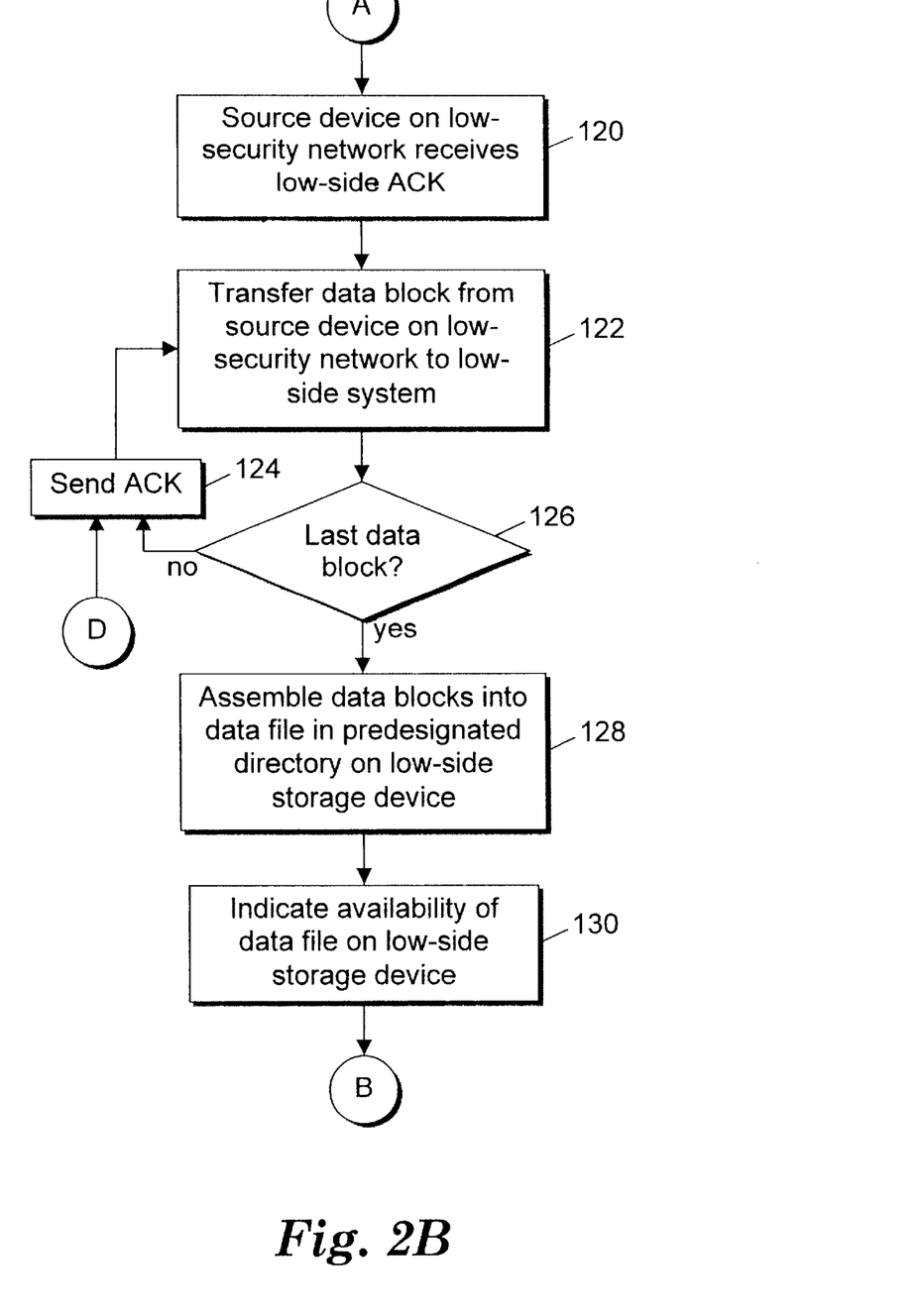

The low-side processor 24 assembles the data blocks of the low-security information into a data file in a predesignated directory on the low-side storage device 26 (step 128). In the preferred embodiment of the invention, the path of the predesignated directory contains '/index'. This precludes an unauthorized file transfer that may attempt to alter the operation of the low-side system 16. For example, if an attacker on the low-security network 10 could transfer in a file with the path 'file/boot/vmlinuz' through the information diode 14, the file sent by the attacker would be loaded as the Linux operating system the next time the low-side system 16 or the high-side system 18 were restarted (i.e., booted). However, sending a file with the path 'index/boot/vmlinuz', which is allowable on the information diode 14, would have no deleterious effect on the information diode 14 or the high-security network 12.

When the transfer of the data file to the low-side storage device 26 is complete, the low-side processor 24 changes the data file's mode under the first modified TFTP to indicate to the high-side system 18 the availability of the file (step 130). Preferably, this is accomplished by changing the data file's Linux access permissions to allow the data file to be read and deleted by the high-side processor 32.

Figure 2C:
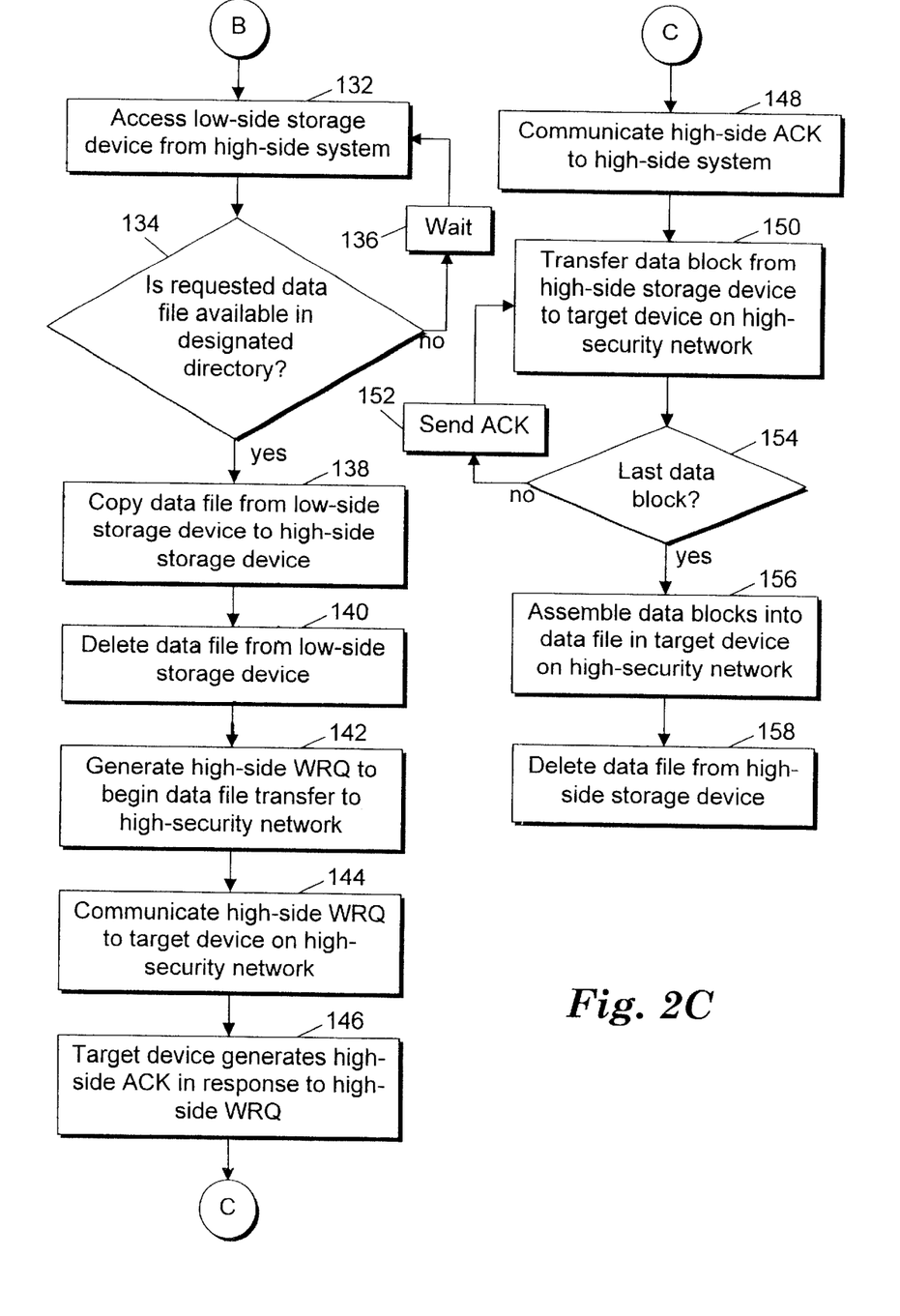

The transfer of low-security data files from the low-side system 16 to the high-side system 18 is preferably accomplished using the standard UNIX network file system (NFS) protocol. Using the NFS protocol, as shown in FIG. 2C, the high-side system 18 accesses the predesignated directory on the low-side storage device 26 (step 132) and looks for an available data file (step 134). If no data file is available, the high-side system 18 waits a predetermined time period (step 136) before again accessing the predesignated directory (step 132) to look for an available data file (step 134). When the requested file becomes available in the predesignated directory, the high-side processor 32 moves the requested data file from the low-side storage device 26 through the low-side intermediate network interface 28, across the intermediate network 20, through the high-side intermediate network interface 30, and to the high-side storage device 34 (step 138). Preferably, the high-side processor 32 moves the requested data file from the low-side storage device 26 to the high-side storage device 34 using a copy command 47 under the NFS protocol. The flow of the low-security information from the requested data file on the low-side storage device 26 to the high-side storage device 34 is represented in FIG. 1 by the arrows 48.

In the preferred embodiment of the invention, the only way to transfer a data file into the high-side system is by the NFS copy command 47 directed to the low-side storage device 26. Preferably, the version of NFS loaded on the high-side system 18 is capable of a one-way-only data file transfer: from the low-side storage device 26 to the high-side storage device 34. Thus, the NFS on the high-side system 18 is not capable of generating a copy command, or any other command, to move data into the high-side system 18 from the high-security network 12, or into the low-side system 16 from the high-side system 18.

After the requested data file has been copied to the high-side storage device 34, the high-side processor 32 causes deletion of the data file from the low-side storage device 26 (step 140) by way of the NFS using a standard Linux file-deletion command (ulink). Actually, the low-side processor 24 deletes the data file, but the deletion is initiated by the high-side processor 32 based on capabilities inherent to the NFS connection.

When the requested data file is available on the high-side storage device 34, the high-side system 18 begins a write operation to transfer the requested data file to the high-security network 12. To begin the write operation, the high-side processor 32 generates a high-side WRQ 50 using the second modified TFTP (step 142). The high-side WRQ 50 is directed to the address of the target device on the high-security network 12. The high-side WRQ 50 is communicated to the high-security network 12 via the high-side network interface 36 (step 144).

In response to the WRQ 50, the device at the target address sends a high-side ACK 51 to the high-side system 18 (step 146). The high-side ACK 51 is communicated to the high-side system 18 via the high-side network interface 36 (step 148).

A transfer of the requested data file from the high-side storage device 34 to the high-security network 12 then begins. According to the TFTP protocol, this transfer is preferably accomplished in sequential blocks of 512 bytes each (step 150), with the target device on the high-security network 12 responding to each received block with a high-side ACK 51 (step 152). This block-by-block data transfer continues in lock-step fashion until the last data block in the requested file has been transferred to the target device on the high-security network 12 (step 154). The flow of the low-security information from the requested data file on the high-side storage device 34 to the high-security network 12 is represented in FIG. 1 by the arrows 49.

Preferably, after the requested data file has been assembled in the target device on the high-security network 12 (step 156), the copy of the requested data file that exists on the high-side storage device 34 is deleted (step 158). This is accomplished under the second modified TFTP running on the high-side processor 32. In this manner, the low-side and high-side storage devices 26 and 34 need provide only intermediate storage of data, such that their storage capacity is not consumed over time.

The previous example explained the operation of the preferred embodiment of the information diode 14 to effect a transfer of the low-security information from the low-security network 10 to the high-security network 12. As discussed previously, this is the only type of information transfer that the information diode 14 will allow. The following examples illustrate the operation of the information diode 14 under circumstances in which requests are made for information transfers that the diode 14 will not allow.

Since the modified versions of TFTP are the only protocols that are loaded on the low-side system 16 or the high-side system 18, the systems 16 and 18 are not capable of processing a communication message generated under any other protocol. Thus, if the low- or high-side systems 16 and 18 receive a request for a data transfer which is generated under any protocol other than TFTP, the systems 16 and 18 will effectively operate as black holes to such a request. The following examples illustrate the operation of the information diode 14 in response to unallowable TFTP requests for data transfers.

Figure 3:
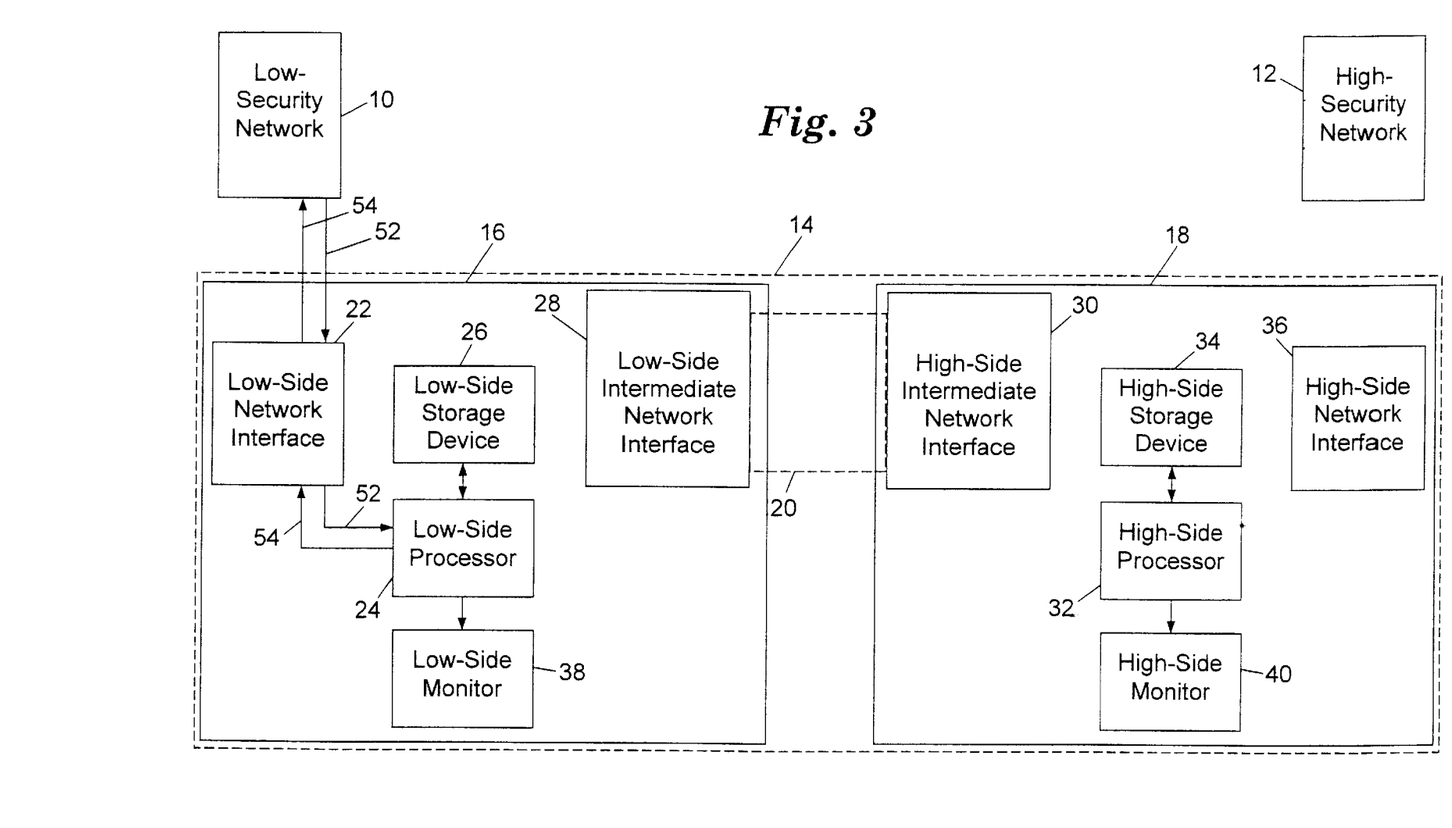
FIG. 3 is a functional block diagram depicting an example of the operation of the information diode according to a preferred embodiment of the invention.

As a second example of the operation of the information diode 14, with reference to FIGS. 2A and 3, consider a situation in which a request is generated on the low-security network 10 for destination network information, also referred to herein as high-security information, that resides on the high-security network 12. First, a requesting device on the low-security network 10 generates a TFTP RRQ packet, hereinafter referred to as a low-side RRQ 52 (step 100 in FIG. 2A). The low-side RRQ 52 contains a TID which identifies the requesting device on the low-security network 10 as the source of the request. The low-side RRQ 52 is communicated to the low-side system 16 via the low-side network interface 22 (step 102).

Preferably, the only types of TFTP packet from the low-security network 10 which the low-side system 16 will accept is a WRQ or a data packet containing low-security information. Thus, the low-side processor 24 checks the operation code of the RRQ 52 to determine what type of TFTP packet has been received (step 104). To prevent spoofing, the processor 24 also determines from which TCP/IP communication port the RRQ 52 was received. In this situation, since the RRQ 52 is a read request (indicated by operation code of 1) received from the TCP/IP communication port corresponding to the low-security network 10, and since the low-side processor 24 operating under the first modified TFTP always denies a RRQ from the low-security network 10, the low-side processor 24 denies the low-side RRQ 52 (step 110).

In the preferred embodiment, the low-side processor 24 denies the low-side RRQ 52 according to the black hole method, that is, by making no reply whatsoever. In an alternate embodiment, the low-side processor 24 denies the low-side RRQ 52 by generating an error packet which is hereinafter referred to as a low-side denial 54. The low-side denial 54 is transferred to the low-side network interface 22 which communicates the denial 54 to the requesting device on the low-security network 10. Thus, either by the preferred black hole lack of response, or by generation of the low-side denial 54, the information diode 14 prohibits the establishment of a data transfer from the low-side system 16 to the low-security network 10. Since no data transfer may be established from the low-side system 16 to the low-security network 10, there is no way for any information, other than WRQ's, ACK's, and denials, to pass from the low-side system 16 to the low-security network 10.

If the low-side processor 24 determines at step 104 that the TFTP packet from the low-security network 10 is a data packet which is part of a data file transfer requested by a device on the high-security network 12, then processing preferably continues at step 124 in FIG. 2A.

Figure 4:
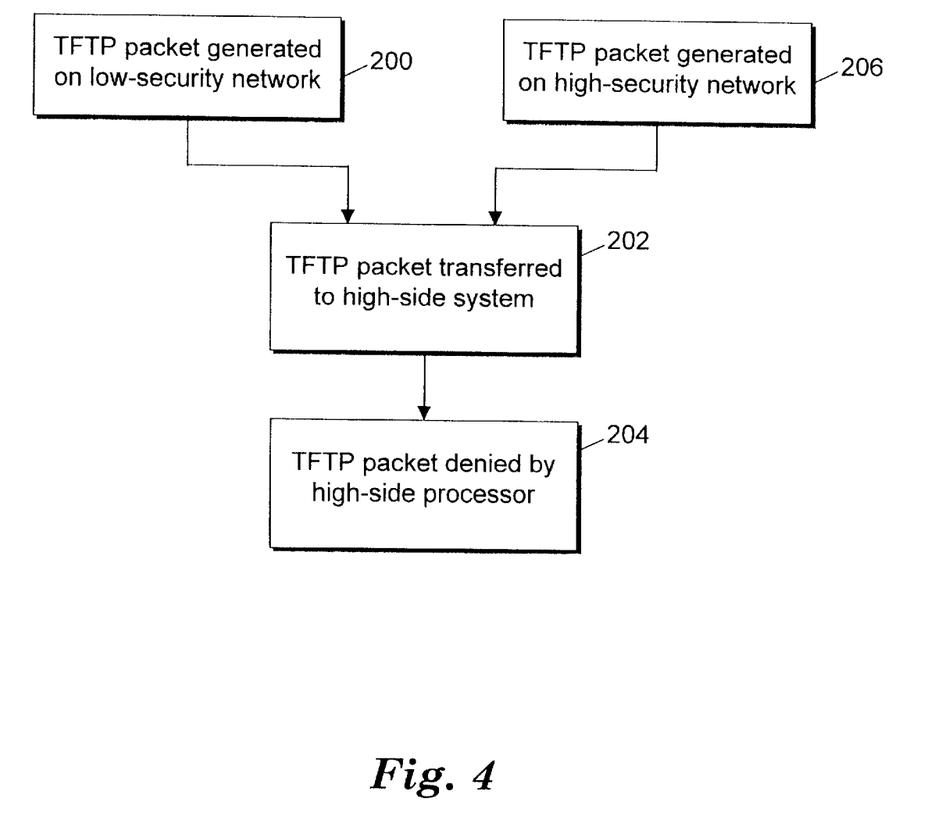
FIG. 4 is a functional flow diagram depicting operation of the information diode according to a preferred embodiment of the invention.
Figure 5:
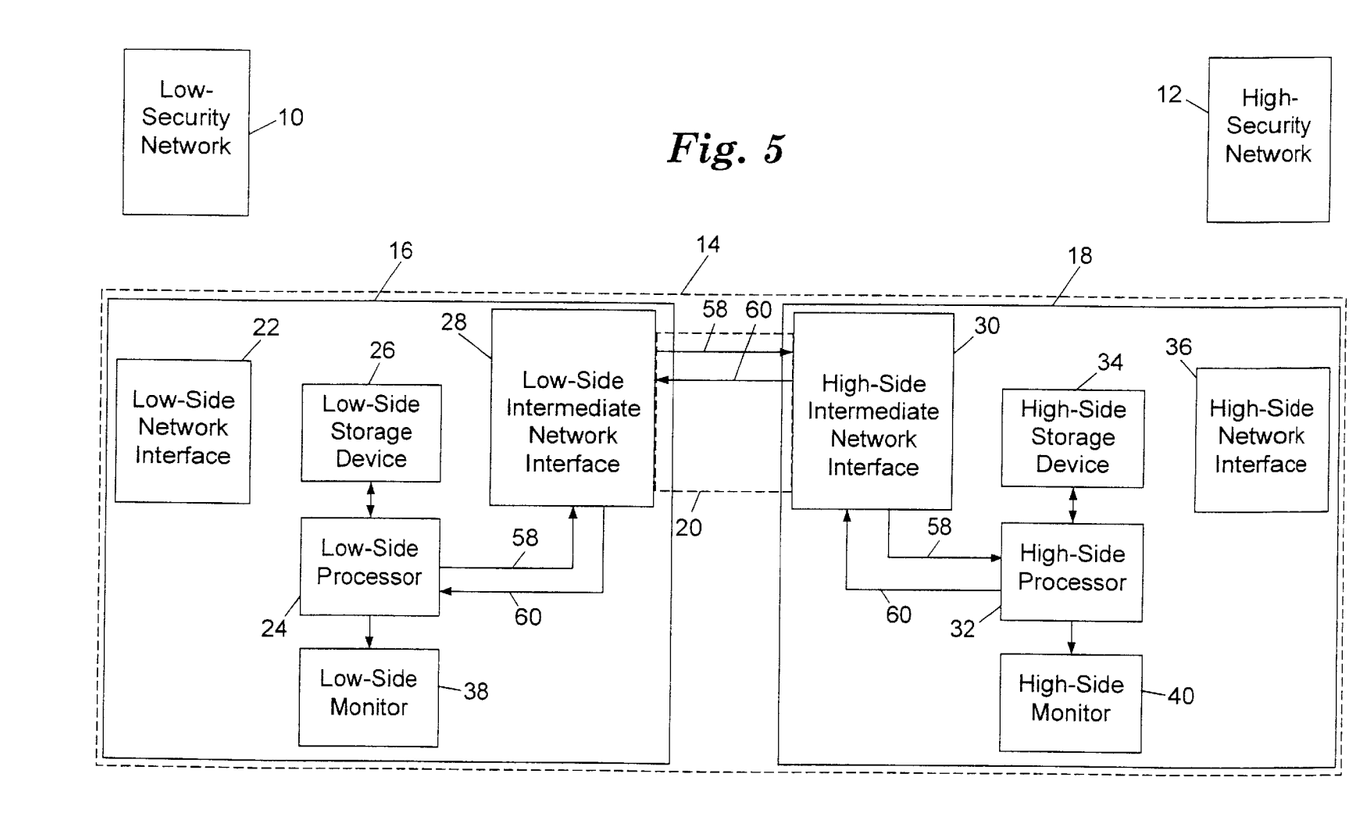
FIGS. 5, 6, 7 and 8 are functional block diagrams depicting further examples of the operation of the information diode according to preferred embodiments of the invention.

With reference to FIGS. 4 and 5, consider a highly unlikely situation in which a TFTP request packet is generated on the low-side system 16 requesting a transfer of high-security information from a target device on the high-security network 12 to the low-side system 16. Such a situation could occur if the security of the low-side system 16 was in some way compromised. Although unlikely, such a request, herein referred to as an intermediate RRQ 58, could possibly be generated on the low-side processor 24 (step 200 in FIG. 4), such as by some clandestine operation, and communicated to the high-side system 18 through the intermediate network 20 (step 202). As discussed previously, the high-side processor 32 operating under the second modified TFTP will always deny all TFTP packets from the low-side system 16, preferably according to the black hole method, or by generating a denial packet. Thus, high-side processor 32 denies the intermediate RRQ 58 (step 204).

In this situation, the high-side processor 32 preferably denies the intermediate RRQ 58 by offering no response according to the black hole method. Alternatively, the processor 32 denies the RRQ 58 by sending a high-side denial 60 to the low-side system 16. Either way, the information diode 14 prohibits the establishment of a file transfer from the high-side system 18 to the low-side system 16. Since no file transfer may be established from the high-side system 18 to the low-side system 16, there is no way for any information, other than RRQ's, denials, and one-way NFS copy commands to pass from the high-side system 18 to the low-side system 16.

Figure 6:
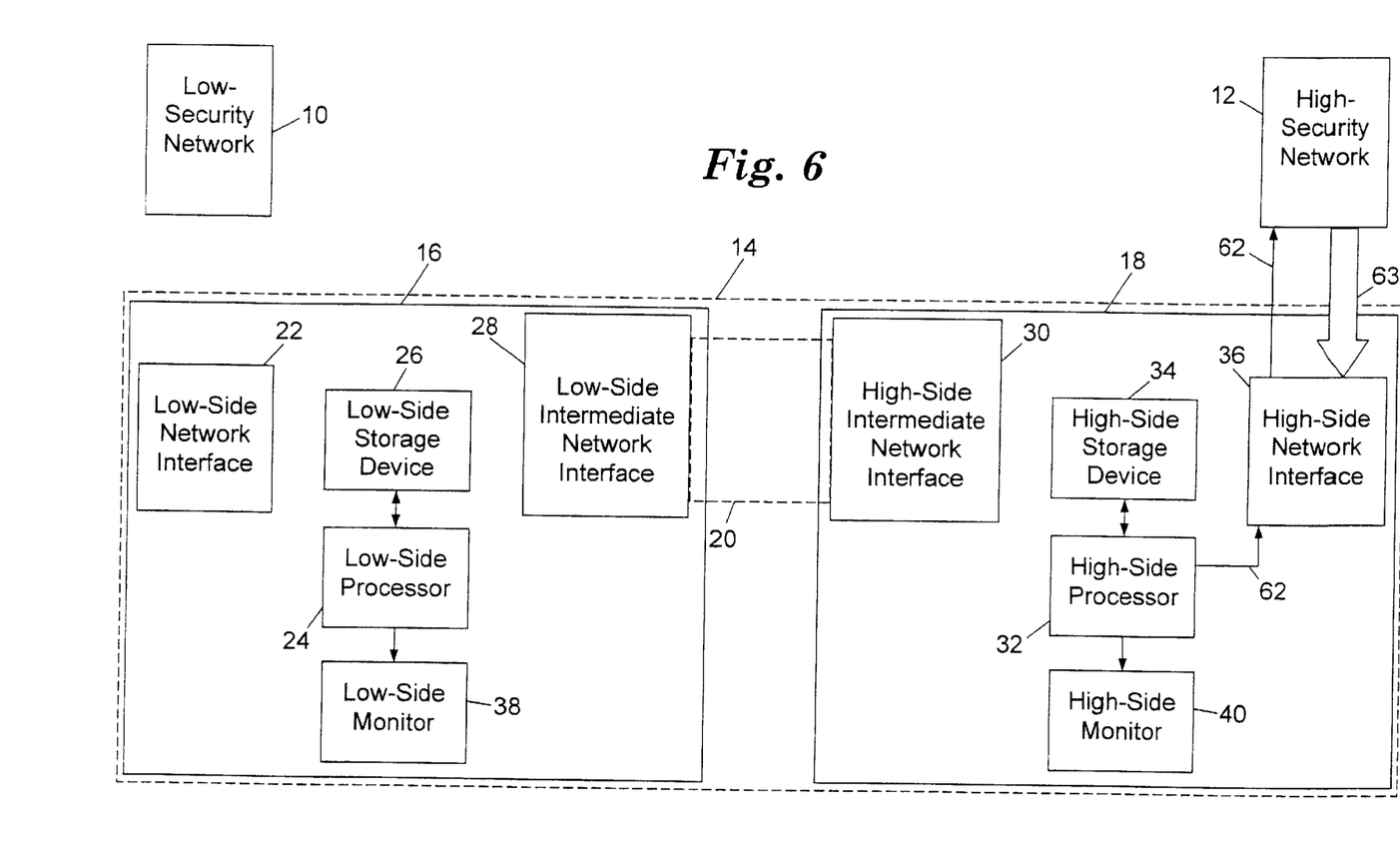

With reference to FIGS. 4 and 6, consider another highly unlikely situation in which a TFTP request packet is generated on the high-side system 18 requesting a transfer of high-security information from a device on the high-security network 12 to the high-side system 18. Such a situation could occur if the security of the high-side system 18 was in some way compromised. Although unlikely, such a request, hereinafter referred to as a high-side WRQ 62, could possibly be generated by the high-side processor 32, such as by some clandestine operation, and communicated to the high-security network 12 through the high-side network interface 36. Although the version of TFTP running on the high-security network 12 would preferably always deny a WRQ from the high-side system 18, this example addresses a situation in which the target device on the high-security network 12 responds by generating a TFTP data packet 63 containing the first block of requested data (step 206 in FIG. 4), and sending the data packet 63 to the high-side system 18 (step 202).

Since the high-side processor 32 operating under the second modified TFTP always denies any TFTP packet from the high-security network 12, the high-side processor 32 denies the data packet 63 (step 204). Preferably, according to the black hole method, this denial is accomplished by making no acknowledgment of the receipt of the data packet.

Figure 7:
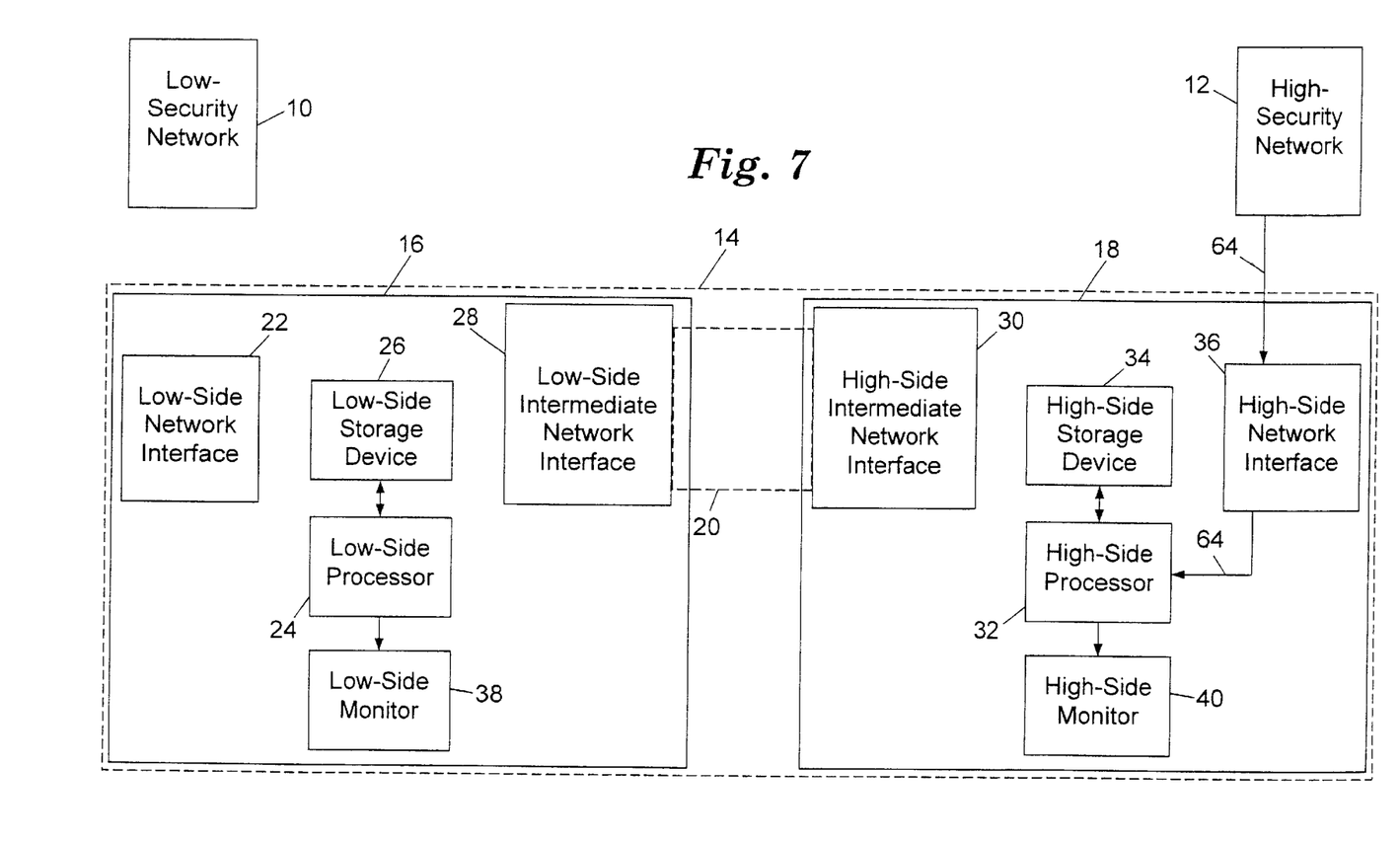
Figure 8:
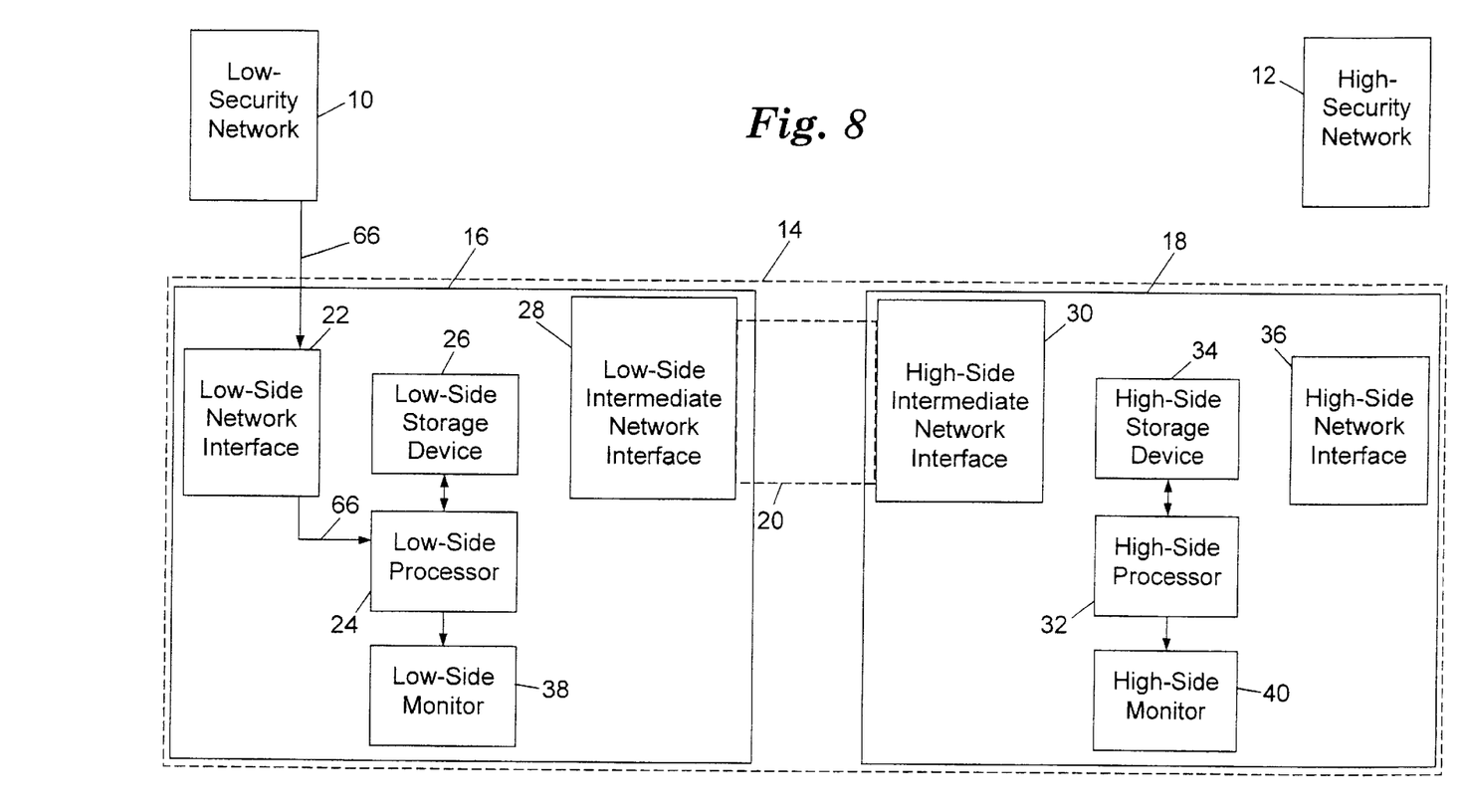

With reference to FIGS. 4 and 7, consider a fifth example in which a TFTP request packet is generated on the high-security network 12 requesting a transfer of high-security information from the high-security network 12 to a target address on the low-security network 10 (step 206 in FIG. 4). As shown in FIG. 7, this request, referred to herein as a high-side WRQ 64 is communicated to the high-side system 18 via the high-side network interface 36 (step 202). Since the high-side processor 32 operating under the second modified TFTP preferably does not recognize or respond to any TFTP packet, the high-side processor 32 does nothing in response to the WRQ 64 (step 204). Thus, the high-side system 18 preferably acts as a black hole to the WRQ 64, thereby prohibiting the establishment of a data transfer from the high-security network 12 to the high-side system 18.

It is contemplated, and will be apparent to those skilled in the art from the preceding description and the accompanying drawings that modifications and/or changes may be made in the embodiments of the invention. Accordingly, it is expressly intended that the foregoing description and the accompanying drawings are illustrative of preferred embodiments only, not limiting thereto, and that the true spirit and scope of the present invention be determined by reference to the appended claims.

What is claimed is:

1. A system for controlling movement of information between a source network and a destination network, where source network information resides on the source network and destination network information resides on the destination network, the system comprising:
    a low-side processing system for communicating with the source network, the low-side processing system having:
        a low-side network interface connected to the source network for receiving the source network information from the source network;
        a low-side processor for controlling movement of the source network information from the source network into the low-side processing system; and
        a low-side intermediate network interface for moving the source network information from the low-side processing system;
    an intermediate network connected to the low-side intermediate network interface for receiving the source network information from the low-side processing system;
    a high-side processing system for communicating with the destination network, the high-side processing system having:
        a high-side intermediate network interface connected to the intermediate network for receiving the source network information from the intermediate network;
        a high-side processor for controlling movement of the source network information from the low-side processing system into the destination network; and
        a high-side network interface connected to the destination network for moving the source network information from the high-side processing system to the destination network;
    the low-side processor having means for prohibiting movement of the destination network information from the high-side processing system to the source network; and
    the high-side processor having means for prohibiting movement of the destination network information from the destination network to the high-side processing system.

2. The system of claim 1 wherein the low-side processor means for prohibiting movement of the destination network information from the high-side processing system to the source network comprises a first modified trivial file transfer protocol which accepts only write requests from the source network.

3. The system of claim 1 wherein the low-side processor means for prohibiting movement of the destination network information from the high-side processing system to the source network comprises a first modified trivial file transfer protocol which denies all read requests from the source network.

4. The system of claim 1 wherein the low-side processor means for prohibiting movement of the destination network information from the high-side processing system to the source network comprises a first modified trivial file transfer protocol which denies all write requests from the high-side processing system.

5. The system of claim 1 wherein the high-side processor means for prohibiting movement of the destination network information from the destination network to the high-side processing system comprises a second modified trivial file transfer protocol which denies all write requests from the destination network.

6. The system of claim 1 further comprising the high-side processor having means for prohibiting movement of the destination network information from the high-side processing system to the low-side processing system.

7. The system of claim 6 wherein the high-side processor means for prohibiting movement of the destination network information from the high-side processing system to the low-side processing system comprises a second modified trivial file transfer protocol which denies all read requests from the low-side processing system.

8. The system of claim 1 wherein the low-side network interface, the high-side network interface, the low-side intermediate network interface, and the high-side intermediate network interface further comprise Ethernet adapters.

9. The system of claim 1 further comprising:
    the low-side processing system having:
        a low-side information storage device for storing the source network information; and
        the low-side processor having means for controlling movement of the source network information from the source network to the low-side information storage device; and
    the high-side processing system having:
        a high-side information storage device for storing the source network information; and
        the high-side processor having means for controlling movement of the source network information from the low-side information storage device to the high-side information storage device.

10. The system of claim 9 wherein the low-side information storage device and the high-side information storage devices comprise disk drives.

11. The system of claim 9 comprising the high-side processor having means for copying the source network information from the low-side information storage device to the high-side information storage device.

12. The system of claim 9 comprising the low-side processor having means for controlling movement of the source network information from the source network to only a predesignated directory on the low-side information storage device.

13. The system of claim 12 comprising the high-side processor having means for copying the source network information from only the predesignated directory on the low-side information storage device to the high-side information storage device.

14. The system of claim 13 comprising the high-side processor having means for copying the source network information from only the predesignated directory on the low-side information storage device to a predesignated directory on the high-side information storage device.

15. The system of claim 13 comprising the high-side processor having means for deleting the source network information from the predesignated directory on the low-side information storage device after the source network information has been copied to the high-side information storage device.

16. The system of claim 9 comprising the high-side processor having means for deleting the source network information from the high-side information storage device after the source network information has been moved to the destination network.

17. A system for controlling movement of information between a source network and a destination network, where source network information resides on the source network and destination network information resides on the destination network, the system comprising:
  a low-side processing system for communicating with the source network, the low-side processing system having:
    a low-side network adapter connected to the source network for receiving the source network information from the source network;
    a low-side disk drive having a predesignated directory thereon;
    a low-side processor for controlling movement of the source network information from the source network to only the predesignated directory on the low-side disk drive using a first modified trivial file transfer protocol which supports only write requests from the source network; and
    a low-side intermediate network interface card for moving the source network information from the low-side processing system;
  an intermediate network connected to the low-side intermediate network interface card for receiving the source network information from the low-side processing system, the intermediate network having:
    a low-side adapter connected to the low-side intermediate network interface card;
    a high-side adapter; and
    a communication medium connected between the low-side adapter and the high-side adapter;
  a high-side processing system for communicating with the destination network, the high-side processing system having:
    a high-side intermediate network interface card connected to the high-side adapter for receiving the source network information from the intermediate network;
    a high-side disk drive;
    a high-side processor for copying the source network information from only the predesignated directory on the low-side disk drive to a predesignated directory on the high-side disk drive, the high-side processor having means for deleting the source network information from the predesignated directory on the low-side disk drive after the source network information has been copied to the predesignated directory on the high-side disk drive, controlling movement of the source network information from the high-side disk drive to the destination network using a second modified trivial file transfer protocol which is different from the first modified trivial file transfer protocol, and deleting the source network information from the high-side disk drive after the source network information has been moved to the destination network; and
    a high-side network adapter connected to the destination network for moving the source network information from the high-side processing system to the destination network;
  the low-side processor having:
    means for prohibiting movement of the destination network information from the low-side processing system to the source network comprising a first modified trivial file transfer protocol which accepts only write requests from the source network and which denies all read requests from the source network; and
    means for prohibiting movement of the destination network information from the high-side processing system to the low-side processing system comprising the first modified trivial file transfer protocol which denies all write requests from the high-side processing system;
  the high-side processor having:
    means for prohibiting movement of the destination network information from the destination network to the high-side processing system comprising a second modified trivial file transfer protocol which denies all write requests from the destination network, and
    means for prohibiting movement of destination network information from the high-side processing system to the low-side system comprising the second modified trivial file transfer protocol which denies all read requests from the low-side processing system.

18. A method for controlling movement of information between a source network and a destination network, where source network information resides on the source network and destination network information resides on the destination network, the method comprising the steps of:
  (a) moving the source network information from the source network to a low-side processing system using a first information transfer protocol that precludes movement of destination network information from the low-side processing system to the source network;
  (b) moving the source network information from the low-side processing system to a high-side processing system across an intermediate network using a network transfer protocol that precludes movement of destination network information from the high-side processing system to the low-side processing system; and
  (c) moving the source network information from the high-side processing system to the destination network using a second information transfer protocol that precludes movement of destination network information from the destination network to the high-side processing system.

19. The method of claim 18 further comprising deleting the source network information from the high-side processing system after the source network information has been moved to the destination network.

20. The method of claim 18 wherein the first information transfer protocol further comprises a first modified trivial file transfer protocol which accepts only write requests from the source network and denies all read requests from the source network.

21. The method of claim 18 wherein the second information transfer protocol further comprises a second modified trivial file transfer protocol which denies all write requests from the destination network.

22. The method of claim 18 further comprising:
   (d) storing the source network information on the low-side processing system; and
   (e) storing the source network information on the high-side processing system.

23. The method of claim 22 wherein step (b) further comprises copying the source network information from a low-side information storage device in the low-side processing system to a high-side information storage device in the high-side processing system.

24. The method of claim 22 further comprising:
   (f) establishing a predesignated directory on a low-side information storage device in the low-side processing system; and
   (g) step (d) further comprises storing the source network information only in the predesignated directory.

25. The method of claim 24 wherein step (b) further comprises copying the source network information only from the predesignated directory on the low-side information storage device in the low-side processing system to a high-side information storage device in the high-side processing system.

26. The method of claim 25 further comprising deleting the source network information from the predesignated directory on the low-side information storage device in the low-side processing system after the source network information has been copied to the high-side information storage device in the high-side processing system.

27. A system for controlling movement of information between a source network and a destination network, the information including source network information on the source network and destination network information on the destination network, the system comprising:

a low-side network interface for receiving from the source network a low-side information packet relating to the information, a low-side processor for analyzing the low-side information packet, for denying the low-side information packet when the low-side information packet is a request to read the destination network information from the destination network, and for generating an acknowledgment in response to the low-side information packet when the low-side information packet is a request to write the source network information to the destination network, the low-side network interface for receiving the acknowledgement, sending the acknowledgement to the source network, receiving the source network information from the source network in response to the acknowledgement, and sending the source network information to a low-side intermediate network interface, the low-side intermediate network interface for sending the source network information received from the low-side network interface across an intermediate network, a high-side intermediate network interface for receiving the source network information from the low-side intermediate network interface across the intermediate network, and sending the source network information to a high-side network interface, the high-side network interface for receiving the source network information from the high-side intermediate network interface, and sending the source network information to the destination network, the high-side network interface further for receiving from the destination network information packets relating to the information, and a high-side processor for denying all information packets received from the destination network.

* * * * *